(12) United States Patent
McBrearty et al.

(10) Patent No.: US 7,028,090 B2
(45) Date of Patent: Apr. 11, 2006

(54) TOKENS UTILIZED IN A SERVER SYSTEM THAT HAVE DIFFERENT ACCESS PERMISSIONS AT DIFFERENT ACCESS TIMES AND METHOD OF USE

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/159,485

(22) Filed: May 30, 2002

(65) Prior Publication Data

US 2004/0015585 A1    Jan. 22, 2004

(51) Int. Cl.
*G06F 15/16* (2006.01)

(52) U.S. Cl. ...................................... 709/229

(58) Field of Classification Search .............. 709/229, 709/225; 713/185, 201; 707/9, 10
See application file for complete search history.

(56) References Cited

U.S. PATENT DOCUMENTS

| | | | | |
|---|---|---|---|---|
| 5,884,308 | A * | 3/1999 | Foulston ........................ | 707/8 |
| 6,161,182 | A * | 12/2000 | Nadooshan ................. | 713/172 |
| 6,314,425 | B1 * | 11/2001 | Serbinis et al. ............... | 707/10 |
| 6,339,793 | B1 * | 1/2002 | Bostian et al. ............... | 709/229 |
| 6,360,254 | B1 * | 3/2002 | Linden et al. ............... | 709/219 |
| 6,449,719 | B1 * | 9/2002 | Baker ........................ | 713/168 |
| 6,609,198 | B1 * | 8/2003 | Wood et al. ................ | 713/155 |
| 2002/0178271 | A1 * | 11/2002 | Graham et al. ............. | 709/229 |
| 2003/0191846 | A1 * | 10/2003 | Hunnicutt et al. .......... | 709/229 |
| 2004/0210771 | A1 * | 10/2004 | Wood et al. ................ | 713/201 |

* cited by examiner

*Primary Examiner*—Abdullahi E. Salad
(74) *Attorney, Agent, or Firm*—Sawyer Law Group LLP

(57) ABSTRACT

A method, system and token are described which control access to a token server system. In a first aspect, a method and system for controlling access to a file system of a token server comprise encoding a time specific permission into a token. In a second aspect, a token server system comprises at least one client and a token server accessible by the at least one client. The token server provides a token to the at least one client to allow the client to have access to the data on the token server. The token includes a time specific permission. In a third aspect, a token for use in a token server system comprises a group of privileges and security identifiers. The token includes a time specific permission. A system and method in accordance with the present invention controls access to networked systems, but does not totally disable or change a system to accommodate temporary outages of access. Individual groups could have different targeted functions (read, write, or execute) tied to different time blocks within a system. The token is not all or nothing, but instead provides finer granularity of function and time for security and access to data.

15 Claims, 3 Drawing Sheets

TOKENS UTILIZED IN A SERVER SYSTEM THAT HAVE DIFFERENT ACCESS PERMISSIONS AT DIFFERENT ACCESS TIMES AND METHOD OF USE

FIELD OF THE INVENTION

The present invention relates generally to tokens utilized in a server system and more particularly to tokens having different access permissions at different times.

BACKGROUND OF THE INVENTION

In networked systems tokens are utilized to allow access by multiple users to information within the networks. FIG. 1 is a block diagram of a networked system 100 which utilizes tokens. The system 100 includes a token server 102 which is coupled to a plurality of clients 104a–104n. The token server 102 includes a file system 106. The file system can be any storage medium accessible by the clients, i.e., disk drive, memory or the like. The clients can access various portions of the file system based upon priority and permissions. These privileges and permissions are enabled by tokens.

Typically, tokens are utilized by a client to ask a token server to grant it temporary access to directories. A token is a group of security attributes permanently attached to a process when a user logs on to the operating system. A token contains privileges and security identifiers for a user, global group, or local group. The privileges regulate the use of some system services and the security identifiers regulate access to protected objects. An example of a type of system which utilizes tokens that has become an industry standard is the use of Kerberos security tokens.

In a typical system, first, the client identifies itself to the server with a login name. Next, the client enters their personal password. Once this password has been verified, the requester client is issued a security token that has certain permissions, i.e., read, write or execute. Additionally, this token has a limited lifetime, typically 24 hours before the token expires and the user must re-apply for a new token. The best example of this type of commercial program, that has become an industry default, is the use of Kerberos security tokens.

However, there may be situations that arise where a given authority needs to be taken away for a specific time period, but then re-enacted to the user. For instance, suppose that during a two hour period over lunchtime, the system administrator wishes to make an archive of a file system, but doesn't want anyone performing any changes (i.e., writes, to the file system). They wish to take a static snapshot of the system during this 2 hour time period. Users may already have asked for and received a security token that lets them read, write, and execute any file within that directory. Currently, the system administrator has one of two options:

(a) take the file system offline so that only the sysadmin can "see" the file system.

(b) perform a global file or directory permission change so that they can lock out users, who may have originally had the correct tokens, but need to be rebuffed temporarily.

Both of these choices remove all tokens previously granted and limit the flexibility of the system. Typically, an access can be controlled via a recursive command, such as "chmod" to lock out writes, reads or executes. However, when this is done some very specific set permissions of certain files are inadvertently changed. For example, suppose someone is in a very deep directory set in which their file is read only. An operation is performed such as "chmod –R –w" is performed to turn off the ability to write to that file (and it doesn't affect it because no one could write to that file anyway). However, in an attempt to return the system to writeability, the sysadmin does a "chmod –R +w" and accidentally changes this previously-read-only file into a writeable file.

Accordingly, what is needed is a system and method for that allows for security tokens to be utilized which have more flexibility in a networked system. The present invention addresses such a need.

SUMMARY OF THE INVENTION

A method, system and token are described which control access to a token server system. In a first aspect, a method and system for controlling access to a file system of a token server comprise encoding a time specific permission into a token.

In a second aspect, a token server system comprises at least one client and a token server accessible by the at least one client. The token server provides a token to the at least one client to allow the client to have access to the data on the token server. The token includes a time specific permission.

In a third aspect, a token for use in a token server system comprises a group of privileges and security identifiers. The token includes a time specific permission.

A system and method in accordance with the present invention controls access to networked systems, but does not totally disable or change a system to accommodate temporary outages of access. Individual groups could have different targeted functions (read, write, or execute) tied to different time blocks within a system. The token is not all or nothing, but instead provides finer granularity of function and time for security and access to data.

DETAILED DESCRIPTION

The present invention relates to generally to tokens utilized in a server system and more particularly to tokens having different access permissions at different times. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for encoding time permissions into an issued security token. In so doing an access to a file system is controlled but not disabled. Individual groups could have different targeted functions (read, write, or execute) tied to different time blocks within a system. It's not an all or nothing type of token, but instead provides a token within the finer granularity of function and time.

Figure 1:
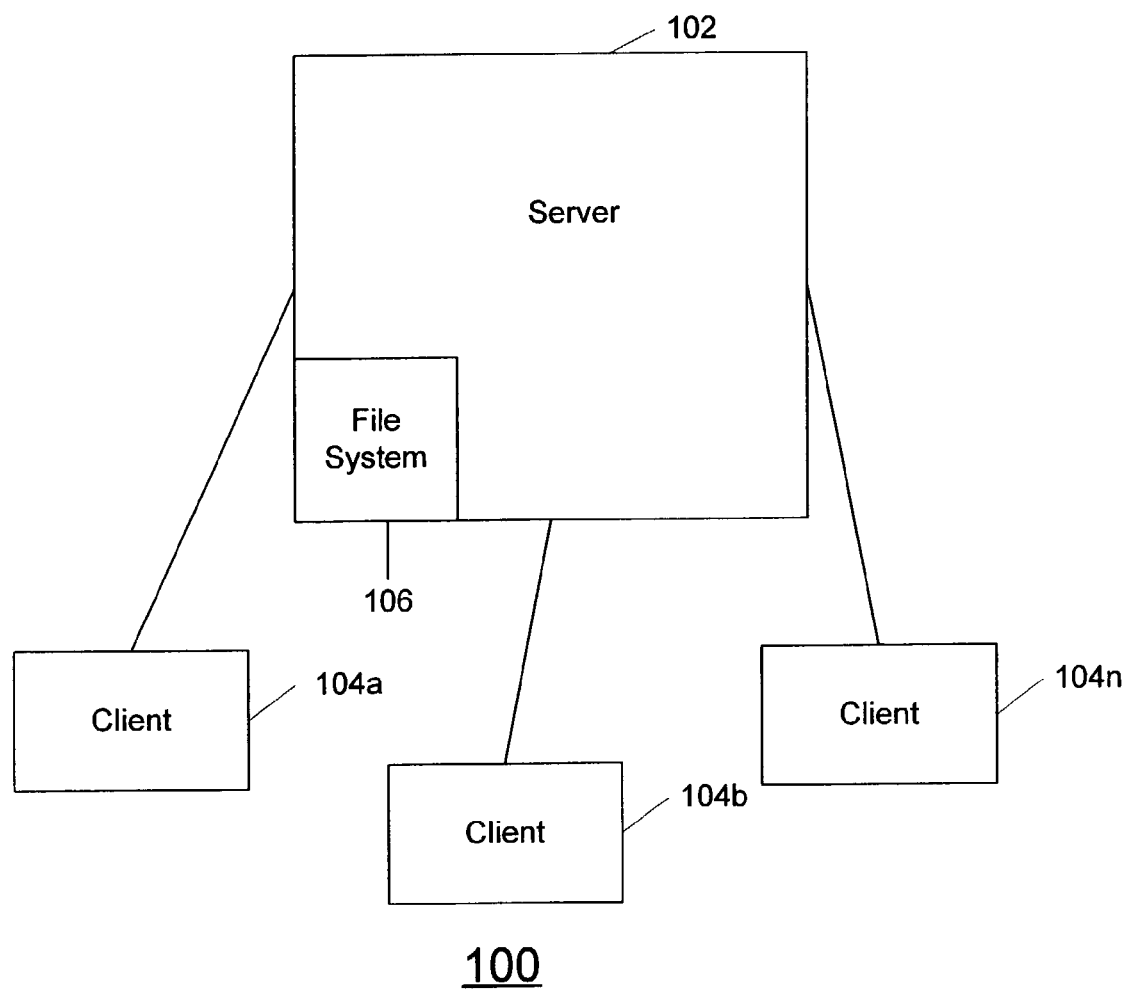
FIG. 1 is a block diagram of a networked system which utilizes tokens.
Figure 2:
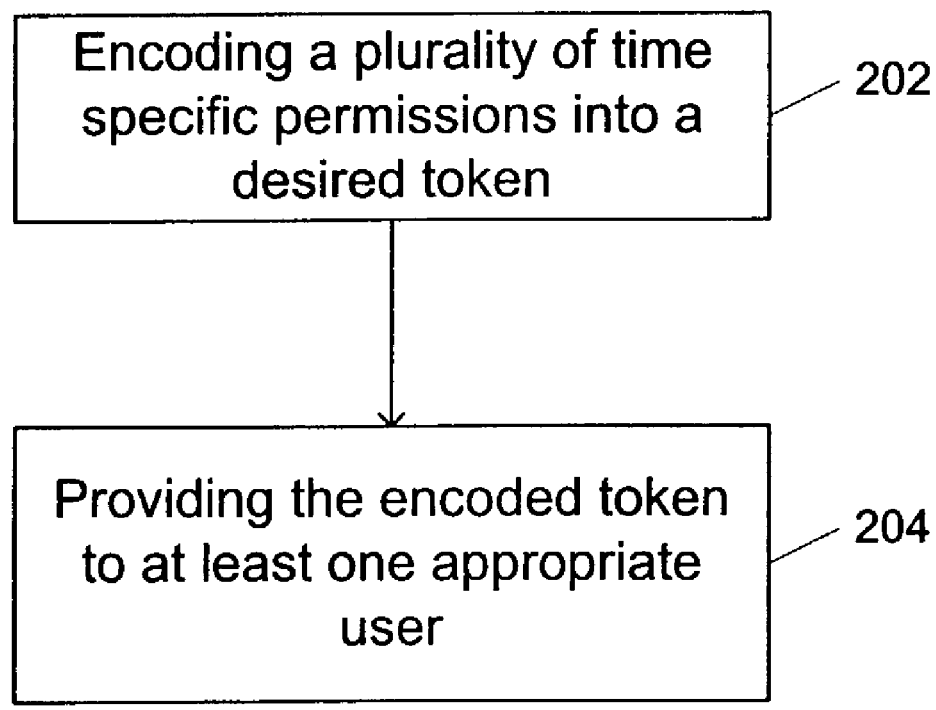
FIG. 2 is a simple flow chart of a method for controlling accessing a file system in accordance with the present invention.

FIG. 2 is a simple flow chart of a method for controlling accessing a file system in accordance with the present invention. First, a token is encoded with at least one time specific permission, via step 202. Next, the encoded token is provided to at least one appropriate user, via step 204.

Figure 3:
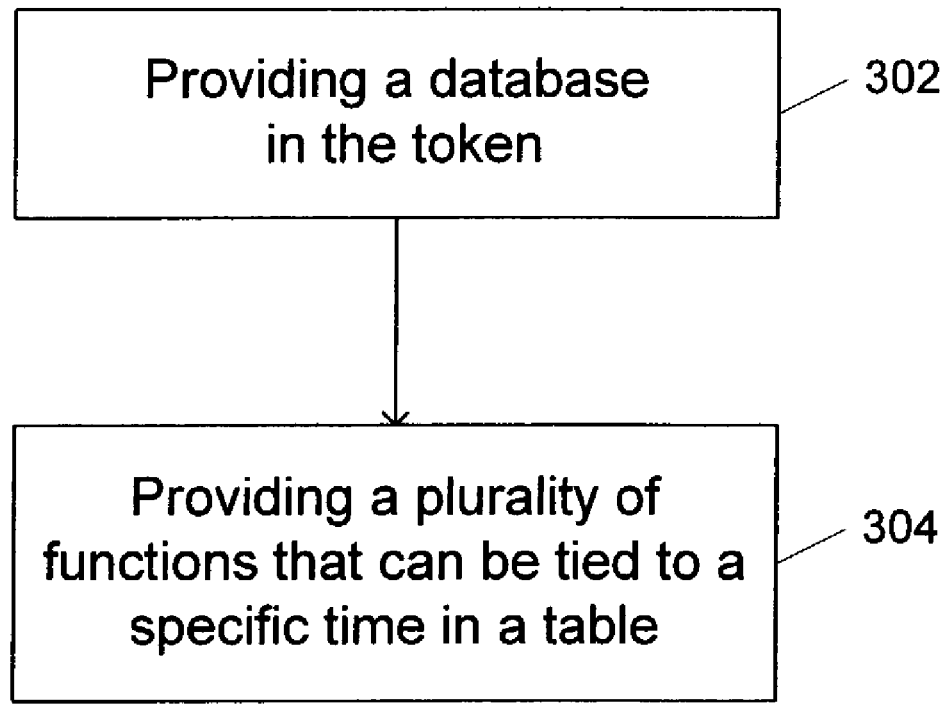
FIG. 3 is a flow chart which illustrates encoding a token in accordance with the present invention.

The encoding step 202 is implanted in a variety of ways. FIG. 3 is a flow chart which illustrates encoding a token in accordance with the present invention.

In a system in accordance with the present invention, instead of a "countdown" timer built into each token (count down of 24 hours from the time of issuance of the token) as in conventional systems, a tiny database is encoded into the token via step 302. In addition, in a preferred embodiment, a lookup table lists exceptions or exclusions of function tied to specific time periods, via step 304.

Thus in the example above, the token can be issued anytime from 1:00 a.m. to 11:30 a.m. But regardless of when the security token was issued, there would be a lookup value that indicated that between 12:00–2:00 pm, no writes would be allowed into the secure directories. However, notice in this example that reads and executes are still allowed during this time frame. This is a special feature of the present invention: different functions or abilities are tied to different time periods.

A system and method in accordance with the present invention controls access to networked systems, but does not totally disable or change a system to accommodate temporary outages of access. Individual groups could have different targeted functions (read, write, or execute) tied to different time blocks within a system. The token is not all or nothing, but instead provides a finer granularity of function and time for security and access to data.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling access to a file system of a token server, the method comprising:
   (a) encoding a time specific permission into a token;
      (a1) encoding a database within the token; and
      (a2) providing a look-up table of exceptions, and inclusions of functions within the database, the exceptions and inclusions of functions being tied to specific time periods.

2. The method of claim 1 including the step of (b) providing the encoded token to an appropriate user.

3. The method of claim 1 wherein functions can be targeted to different time periods within the time encoded specific permission.

4. The method of claim 3 wherein the different functions can include any one of a read, write and execute command.

5. A token server system comprising:
   at least one client; and
   a token server accessible by the at least one client the server for providing a token to the at least one client for allowing the at least one client to have access to data on the token server; the token including an encoded time specific permission, wherein the encoded token comprises:
   a database; and
   a look-up table of exceptions, and inclusions of functions within the database, the exceptions and inclusions of functions being tied to specific time periods.

6. The token server system of claim 5 wherein functions can be targeted to different time periods within the time specific permission.

7. The token server system of claim 6 wherein the different functions can include any one of a read, write and execute command.

8. A computer readable medium containing program instructions for controlling access to a file system of a token server, the program instructions for:
   (a) encoding a time specific permission into a token;
      (a1) encoding a database within the token; and
      (a2) providing a look-un table of exceptions, and inclusions of functions within the database, the exceptions and inclusions of functions being tied to specific time periods.

9. A computer readable medium containing program instructions of claim 8 including program instructions for providing the encoded token to an appropriate user.

10. The computer readable medium containing program instructions of claim 8 wherein functions can be targeted to different time periods within the time specific permission.

11. The computer readable medium containing program instructions of claim 10 wherein the different functions can include any one of a read command, a write command and one execute command.

12. A system for controlling access to a file system of a token server comprising:
   means for encoding a time specific permission into a token;
   means for encoding a database within the token; and
   means for providing a look-up table of exceptions, and inclusions of functions within the database, the exceptions and inclusions of functions being tied to specific time periods.

13. The system of claim 12 which includes means for providing the encoded token to an appropriate user.

14. The system of claim 12 wherein functions can be targeted to different time periods within the time specific permission.

15. The system of claim 14 wherein the different functions can include any one of a read command, a write command, and an execute command.

* * * * *